United States Patent [19]
Kuchta et al.

[11] Patent Number: 5,164,831
[45] Date of Patent: Nov. 17, 1992

[54] ELECTRONIC STILL CAMERA PROVIDING MULTI-FORMAT STORAGE OF FULL AND REDUCED RESOLUTION IMAGES

[75] Inventors: Daniel W. Kuchta, Brockport; Peter J. Sucy, Hamlin, both of N.Y.

[73] Assignee: Eastman Kodak Company, Rochester, N.Y.

[21] Appl. No.: 494,205

[22] Filed: Mar. 15, 1990

[51] Int. Cl.$^5$ ............................................. H04N 5/30
[52] U.S. Cl. ..................................... 358/209; 358/102; 358/909; 358/432; 360/35.1
[58] Field of Search .............. 358/432, 909, 906, 403, 358/433, 445, 447, 448, 452, 458, 133, 459, 209, 471, 102; 360/33.1, 35.1

[56] References Cited

U.S. PATENT DOCUMENTS

| | | |
|---|---|---|
| 4,302,776 | 11/1981 | Taylor et al. . |
| 4,587,633 | 5/1986 | Wang et al. ......................... 358/403 |
| 4,656,525 | 4/1987 | Norris . |
| 4,689,696 | 8/1987 | Plummer ............................. 358/909 |
| 4,691,253 | 9/1987 | Silver .................................. 360/35.1 |
| 4,698,672 | 10/1987 | Chen et al. ......................... 358/136 |
| 4,730,222 | 3/1988 | Schauffele ......................... 360/33.1 |
| 4,763,208 | 8/1988 | Kawamura et al. . |
| 4,774,600 | 9/1988 | Baumeister . |
| 4,777,525 | 10/1988 | Preston, Jr. . |
| 4,782,399 | 11/1988 | Sato .................................... 358/447 |
| 4,802,019 | 1/1989 | Harada et al. . |
| 4,827,347 | 5/1989 | Bill . |
| 4,930,007 | 5/1990 | Sugiura et al. ..................... 358/462 |
| 4,930,014 | 5/1990 | Maeda et al. ...................... 358/209 |
| 4,999,715 | 3/1991 | Porcellio et al. .................. 358/433 |
| 5,014,134 | 5/1991 | Lawton et al. ..................... 358/432 |
| 5,016,107 | 5/1991 | Sasson et al. ...................... 358/209 |
| 5,018,017 | 5/1991 | Sasaki et al. ....................... 358/209 |
| 5,027,214 | 6/1991 | Fajimori ............................. 358/102 |
| 5,027,221 | 6/1991 | Hisatake ............................ 358/452 |
| 5,032,927 | 7/1991 | Watanabe .......................... 358/909 |

OTHER PUBLICATIONS

Research Disclosure #28618, p. 71, Feb. 88, "Mosaic Picture Track on Video Dish".

*Primary Examiner*—James J. Groody
*Assistant Examiner*—Jeffrey S. Murrell
*Attorney, Agent, or Firm*—David M. Woods

[57] ABSTRACT

An electronic still camera employs digital processing of image signals corresponding to a still image and storage of the processed image signals in a removable static random access memory card. An image sensor is exposed to image light and the resultant analog image information is converted to digital image signals. A control processor controls the exposure section and the A/D converter, delivering digital signals to a multi-image buffer at a rate commensurate with normal operation of the camera. A digital processor operates on the stored digital signals, transforming blocks of the digital signals and encoding the signals into a compressed stream of processed image signals, which are downloaded to the memory card. The digital processor operates at a throughput rate different than the input rate for better image capture and optimum utilization of the camera.

15 Claims, 3 Drawing Sheets

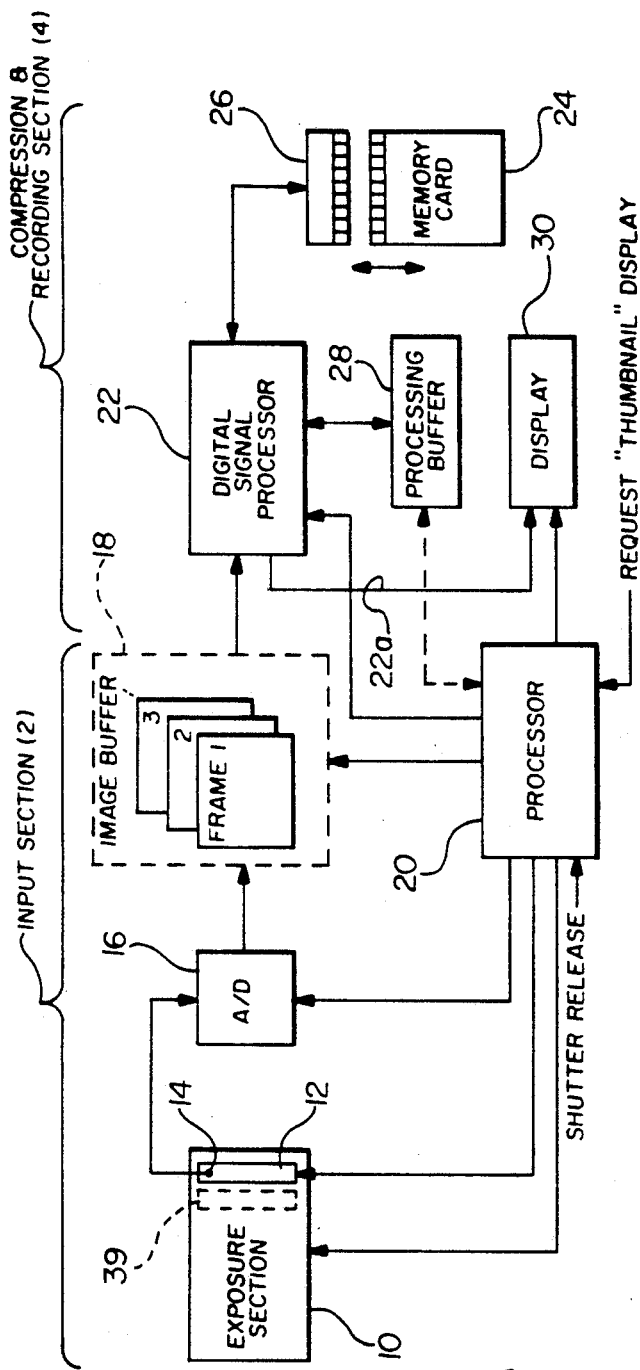
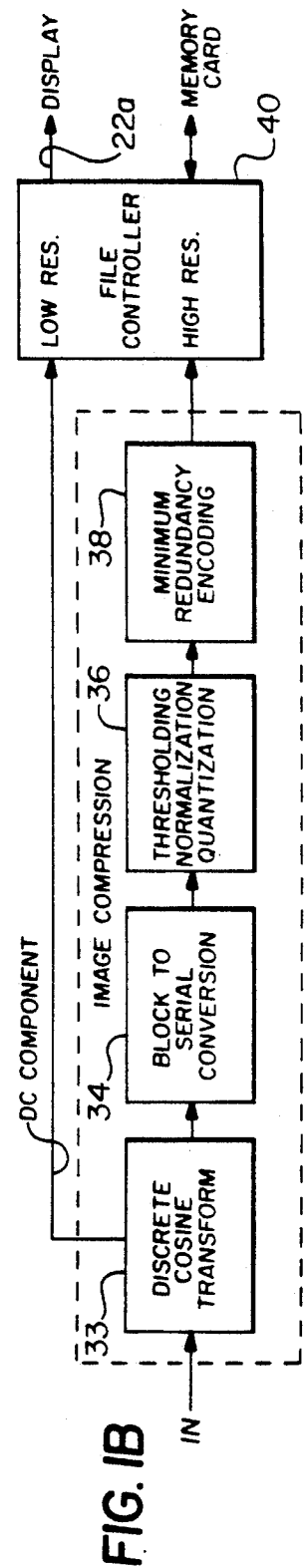
FIG. 1A
FIG. 1B

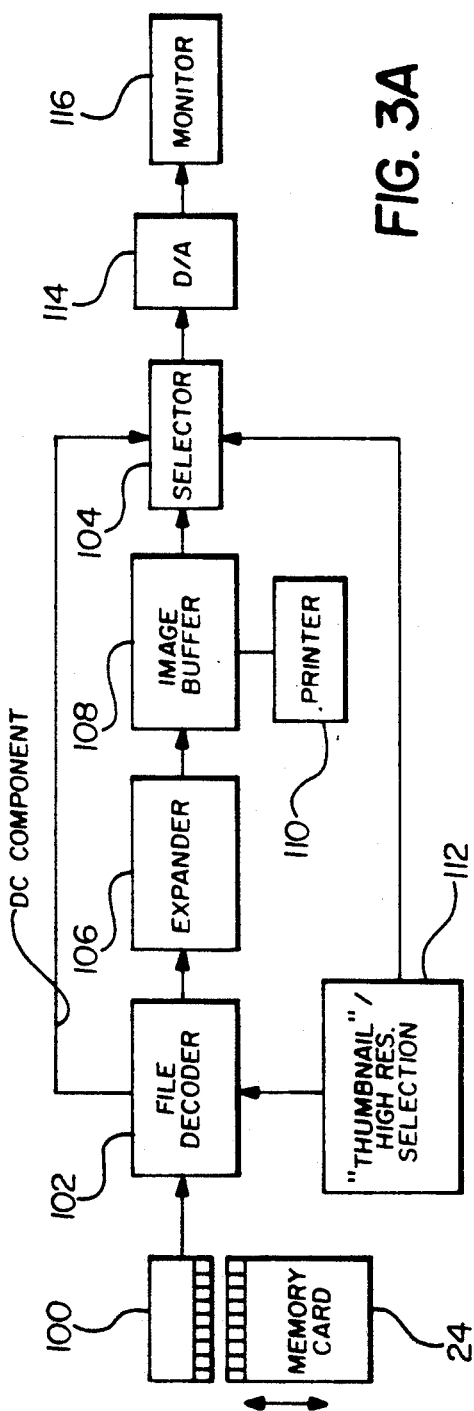
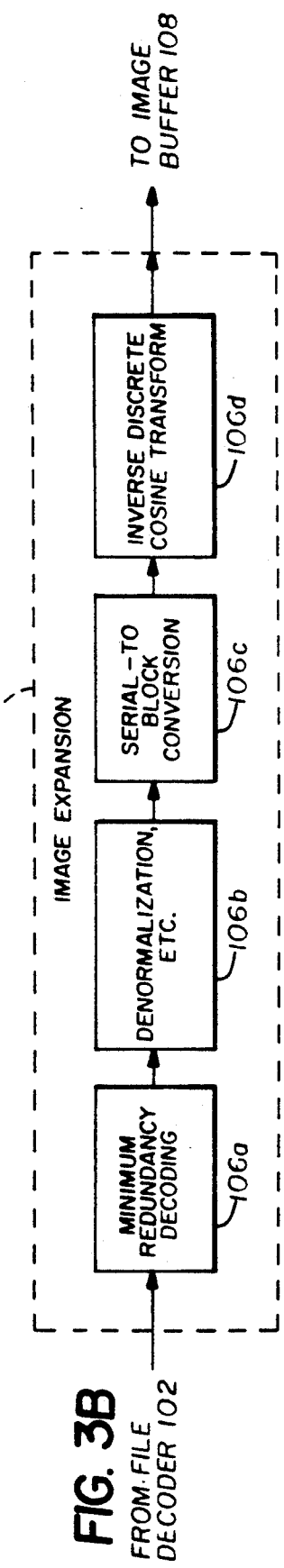
FIG. 3A
FIG. 3B

ELECTRONIC STILL CAMERA PROVIDING MULTI-FORMAT STORAGE OF FULL AND REDUCED RESOLUTION IMAGES

BACKGROUND OF THE INVENTION

1. Field of the Invention

The present invention pertains in general to the field of electronic still imaging and, more particularly, to apparatus incorporating digital processing of image signals derived from an electronic image sensor and digital storage of the processed signals.

2. Description Relative to the Prior Art

An electronic still camera employing non-volatile storage of digital image signals is described in copending U.S. patent application Ser. No. 349,566, filed May 9, 1989 now U.S. Pat. No. 5,016,107 dated May 1, 1991, and assigned to the same assignee as the present invention. The electronic still camera disclosed therein employs digital processing of image signals corresponding to a still image and storage of the processed image signals in a removable static random access memory card. An image sensor is exposed to image light and the resultant analog image information is converted to digital image signals. The digital signals are delivered to a multi-image buffer at a rate commensurate with normal operation of the camera. A digital processor operates on the stored digital signals, transforming blocks of the digital signals and encoding the signals into a compressed stream of processed image signals, which are downloaded to the memory card. The digital processor operates at a throughput rate different than the input rate, thereby allowing more efficient image capture and optimum utilization of the camera.

Despite efficient operation of such a camera and the use of compression to reduce the amount of data, high quality digital image files written in the memory card are nonetheless quite large and take significant amounts of time to process due to image size, image resolution, and the nature of the compression process. For example, a 1,280 by 1,024 pixel, 24-bit per pixel image might compress over many seconds to 100 to 300 Kilobytes of storage area. It is often desirable to quickly review the images on the memory card before deciding to transmit, to make a copy, or to retake a picture. The physical time for decompression and display of a high resolution image can be so slow as to interfere with the review process.

The matter of electronic preview has been taken up in a number of prior art disclosures. For instance, in U.S. Pat. No. 4,827,347 an electronic still camera includes a Plurality (twelve) of small displays connected to a like plurality of display/framestores so that pictures can be previewed as a group and then individually retained or discarded. The aforementioned processing time problem, however, is not addressed. In U.S. Pat. No. 4,763,208, an electronic still camera cooperates with playback apparatus that subsamples images recorded on a disk and simultaneously displays the subsampled images as a group on a monitor. While with this construction the contents of the disk can be searched within a shorter time, the subsampled images are unavailable for subsequent review. Research Disclosure item 28618 (p. 71 of the February, 1988 issue) describes a concept for storing video signals from electronically scanned negatives on individual tracks of a video disk while simultaneously storing miniature versions of these pictures in a mosaic frame store. After all the images are recorded on their individual tracks, and the mosaic frame store is accordingly filled, the mosaic-like content of the frame store is itself recorded as a full NTSC frame on a separate track. A similar concept is applied to an all-video picture processing system in U.S. Pat. No. 4,802,019 for rearranging, replacing, or inserting video programs in a sequence of such programs. Each program is characterized by a single frame that is reduced or "squeezed" to one sixteenth its original size and included in a mosaic of like pictures on an index screen. Rearrangement, etc. of the video programs is then made by reference to the index screen. In the latter two systems, the miniaturized pictures are stored together as a video frame. This is of little aid in an all-electronic system in which the pictures are, for example, separately transmitted to a remote location, separately edited, or otherwise used in a way in which continued, rapid review of a particular recorded picture is desirable.

SUMMARY OF THE INVENTION

The invention is based on the addition of a reduced resolution image to the digital file format for an individual high resolution image. Particularly if the reduced resolution, or "thumbnail", image is created as a part of the image acquisition process, or in close timing thereto, it is convenient to provide multi-format storage of the "thumbnail" image in a reserved area associated with each image file. The "thumbnail" image then follows the high resolution image wherever the image file travels. Since the "thumbnail" image is easily and quickly accessed, reviewing and display is extremely fast.

In accordance with the invention, electronic still imaging apparatus employs digital processing of image signals corresponding to a still image and storage of the processed image signals in a digital memory. The imaging apparatus also includes an image sensor having an array of photosites corresponding to picture elements of the image and means for exposing said sensor to image light so that analog image information is generated in respective photosites. The analog image information is converted into digital image signals and, further, reduced resolution signals are generated from the digital image signals. A multi-format image file is formed by combining the (full resolution) digital image signals and the reduced resolution signals. The image file is then stored in the digital memory, where the reduced resolution signals may be quickly accessed for rapid display.

In accordance with a further embodiment of the invention, electronic still image processing apparatus includes an image buffer with storage capacity for storing digital image signals corresponding to a still image. A digital processor transforms blocks of the stored digital image signals into corresponding sets of transform coefficient signals and encodes the coefficient signals into a compressed stream of processed image signals. In addition, the digital processor generates reduced resolution image signals from the stored digital image signals and downloads both the processed (high resolution) image signals and the reduced resolution image signals to a digital memory. In a preferred implementation, the reduced resolution signals are based on the average or dc component coefficient signals generated during the transformation.

BRIEF DESCRIPTION OF THE DRAWINGS

The invention will be described in relation to the drawings, in which:

FIG. 1A is a block diagram of an electronic still camera employing digital processing and multi-format storage according to the invention;

FIG. 1B is a block diagram of an exemplary form of image compression used in connection with the invention;

FIG. 3A is a block diagram of an electronic still player for use in reproducing pictures taken with the camera of FIG. 1A; and FIG. 3B is a block diagram of an exemplary form of image expansion used in connection with the player of FIG. 3A.

DETAILED DESCRIPTION OF THE INVENTION

Figure 2A:
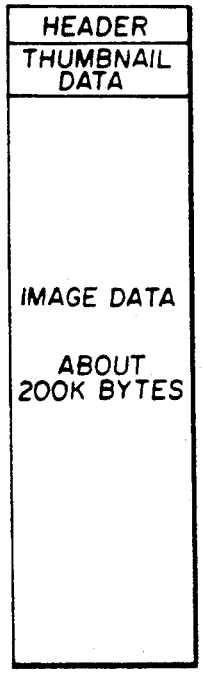
FIG. 2A is a diagram of a preferred file format for a single full resolution image and its associated "thumbnail" image.

Because electronic still cameras employing charge-coupled device (CCD) sensors are well known, the present description will be directed in particular to elements forming part of, or cooperating more directly with, apparatus in accordance with the present invention. Elements not specifically shown or described herein may be selected from those known in the art.

Referring initially to FIGS. 1A and 1B, an electronic still camera is divided generally into an input section 2 and a compression and recording section 4. The input section 2 includes an exposure section 10 for directing image light from a subject (not shown) toward an image sensor 12. Although not shown, the exposure section 10 includes conventional optics for directing the image light through a diaphragm, which regulates the optical aperture, and a shutter, which regulates exposure time. The sensor 12, which includes a two-dimensional array of photosites providing a predetermined picture resolution corresponding to the number of picture elements of the image, is a conventional charge-coupled device (CCD) using either well-known interline transfer or frame transfer techniques. Preferably, the sensor 12 is a high resolution device such as the model KAF-1400 sensor, a 1320(H)×1035(V)-element full-frame CCD imager manufactured by the Eastman Kodak Company. The sensor 12 is exposed to image light so that analog image charge information is generated in respective photosites. The charge information is applied to an output diode 14, which converts the charge information to analog image signals corresponding to respective picture elements. The analog image signals are applied to an A/D converter 16, which generates a digital image signal from the analog input signal for each picture element.

The digital signals are applied to an image buffer 18, which is a random access memory (RAM) with storage capacity for a plurality of still images. A control processor 20 generally controls the input section 2 of the camera by initiating and controlling exposure (by operation of the diaphragm and shutter (not shown) in the exposure section 10), by generating the horizontal and vertical clocks needed for driving the sensor 12, and for clocking image information therefrom, and by enabling the A/D converter 16 in conjunction with the image buffer 18 for each analog signal segment relating to a picture element. (The control Processor 20 would ordinarily include a microprocessor coupled with a system timing circuit.) Once a certain number of digital image signals have been accumulated in the image buffer 18, the stored signals are applied to a digital signal processor 22, which controls the compression and recording section of the camera. The processor 22 applies a compression algorithm to the digital image signals, and sends the compressed signals to a removable memory card 24 via a connector 26. A representative memory card is a 512 K-byte static random access memory (SRAM) available from Mitsubishi Corp. (A 1 megabyte memory card has been recently announced by ITT Canon.)

Since the compression and related processing ordinarily occurs over several steps, the intermediate products of the processing algorithm are stored in a processing buffer 28. (The processing buffer 28 may also be configured as part of the memory space of the image buffer 18.) The number of image signals needed in the image buffer 18 before digital processing can begin depends on the type of processing, that is, for a block transformation to begin, a block of signals including at least a portion of the image signals comprising a video frame must be available. Consequently, in most circumstances, the compression may commence as soon as the requisite block, e.g., of 16×16 picture elements, is present in the buffer 18.

The input section 2 operates at a rate commensurate with normal operation of the camera while compression, which consumes more time, can be relatively divorced from the input rate. The exposure section 10 exposes the sensor 12 to image light for a time period dependent upon exposure requirements, for example, a time period between 1/1,000 second and several seconds. The image charge is then swept from the photosites in the sensor 12, converted to a digital format, and written into the image buffer 18 during a standard rate, which may, for example, corresPond to a standard video field or frame rate. The repetition rate of the driving signals provided by the control processor 20 to the sensor 12, the A/D converter 16 and the buffer 18 are accordingly generated to achieve such a transfer. The processing throughput rate of the compression and recording section 4 is determined by the character of an image, i.e., the amount of detail versus redundant information, and the speed of the digital signal processor 22, and may take up to several seconds for an especially complex image. For this reason, the image buffer 18 shown in FIG. 1 provides for storage of a plurality of images, in effect allowing a series of images to "stack up" at video rates. Further description of the operation of the image buffer is provided in the aforementioned, copending U.S. patent application Ser. No. 349,566.

In addition to the full resolution, compressed image, the digital signal processor 22 generates a reduced resolution, or "thumbnail", image from the original image and outputs the reduced resolution image, together with the compressed image to the memory card 24 as a multi-format image file. A multi-format image file with a "thumbnail" area as it would appear on the memory card 24 is shown in FIG. 2A for one image and in FIG. 2B for several images. In each case, the reduced resolution image signals occupy a defined area near the beginning of each image file. A header may be used before each image file (FIG. 2A) or a directory can identify the location of each image file (FIG. 2B) on the card. On request from the processor 20, the digital signal processor 22 recovers the "thumbnail" image from the image file and outputs it on a line 22a to a display device 30.

Inasmuch as the "thumbnail" image is itself low resolution, the display device 30 may be a low resolution electro-optical device such as a liquid-crystal display. Alternatively, the display device 30 can be of higher resolution and display the "thumbnail" image in a window or portion of the display space.

The "thumbnail" image may be generated by any one of several methods. Average values could be determined for given areas of the original image, or the original image could be subsampled over its entire area. The resulting "thumbnail" data could be grey-scale or full color, and the number of bits/per pixel could vary to suit the needs of the application. In any case, the criteria would be that 1) the "thumbnail" data should add a minimum amount to the overall file size and 2) the "thumbnail" image should contain enough information to present a recognizable representation of the original image.

The digital signal processor 22 compresses each still video image stored in the image buffer 18 according to the image compression algorithm shown in FIG. 1B. The compression algorithm begins with a discrete cosine transformation (block 33) of each successive block of the image data to generate a corresponding block of cosine transform coefficients. It is well-known that compression techniques are greatly enhanced when applied to image data which has been previously transformed in accordance with a discrete cosine transform algorithm. The "thumbnail" image data is preferably taken from the discrete cosine transformation (as will be explained) and applied to a file controller (block 40), which provides the "thumbnail" data on the line 22a to the display device 30 and combines the compressed data with the "thumbnail" data to provide the multi-format image file to the memory card 24.

The cosine transform coefficients are rearranged in serial order by a block-to-serial conversion step (block 34) described and illustrated in U.S. Pat. No. 4,772,956, "Dual Block Still Video Compander Processor," issued Sep. 20, 1988 to Roche et al, and which is assigned to the assignee of the present invention and incorporated by reference into the present patent application. The block-to-serial conversion step consists of arranging the discrete cosine transform coefficients in order of increasing spatial frequency, which corresponds to a zig-zag pattern illustrated in the Roche et al patent. The resulting serial string of transform coefficients is then subjected to conventional thresholding, normalization, and quantization (block 36) and minimum redundancy encoding (block 38). Thresholding discards data words of magnitudes less than a threshold number. Normalization entails dividing each data word by a divisor to yield a quotient. Quantization discards the fractional bits in the quotient. Minimum redundancy encoding is a technique well-known in the prior art for reducing the number of bits required to represent a frame of video information, without reduction in image quality, thereby greatly reducing the amount of storage that must be allocated to each still frame in the memory card 24.

The compressed video data does not emerge from the processor 22 as a standard-length stream of bits, but as a variable number of bits dependent upon the complexity of the picture and the rules used for truncating bits. The memory space, therefore, allocated for each image in the memory card 24 can vary from image to image. The processor 22, consequently, allocates memory space in the memory card 24 after each compression sequence for an image is completed so that the multi-format image files may be "packed" into the card as a continuum of compressed image data. This means the storage capacity, in terms of actual images, of the memory card is unknown in the beginning, and then gradually is specified as pictures are taken and the card is "filled". Alternatively, a fixed "maximum" space can be allocated in the memory card 24 for each multi-format image file; in this case, fewer images can be stored although the total capacity is always known.

What has been described to this point applies equally to monochrome or color pictures, except that color pictures require additional processing. For instance, if a multi-spectral color filter array (shown in broken line 39 in FIG. 1A) overlies the image sensor 12, the various colors are sorted out and processed differently for each color. This would be accomplished by an additional routine in the digital signal processor 22. Such color filter array processing would precede the discrete cosine transform block 33 (FIG. 1B) so that image compression can be done separately on each color and three compressed frames would be stored in the memory card 24 for each image.

Despite the degree of compression, a high quality digital image derived from a high resolution sensor can be large and, due to the necessity of decompression or expansion, require significant amounts of time to display due to size, resolution, and compression schemes. In keeping with the invention, the "thumbnail" or reduced resolution image is added to the compressed digital file format to make reviewing the image at any point in the imaging chain very fast. In terms of the multi-format file, a "thumbnail" image is a much smaller data file added to the original image data file. Although the image file may vary in length due to compression techniques, the "thumbnail" image would always be a known size based on the number of pixels in the original image.

An example would be a 1,280 by 1,024 pixel, 24-bit per pixel, compressed original image stored on a RAM-card mass storage device. This file might take on the order of 100 to 300 kilobytes of storage area depending on compression type. To display the image, it must first be expanded, and the resulting 4 Megabytes of information transferred to a display device. A "thumbnail" image is constructed by using the average value of each 16 by 16 pixel area in the original image to represent each pixel of the "thumbnail" image. If each pixel has an 8-bit grey scale, this would add about 5 Kilobytes to the overall image file size. To display the "thumbnail" image, no expansion is necessary, and only 5 Kilobytes of information needs to be transferred to the display device. The resulting image would be of sufficient quality to identify the subject matter of the original.

A "thumbnail" image generated from average values is preferable to one generated by simple subsampling (throwing away all but one pixel in a block). The averaged image looks more like the original with much less "blockiness" and less loss of detail. The preferred method for generating the "thumbnail" images uses the average or dc values from the DCT (Discrete Cosine Transform) algorithm, which were generated for compression of the image. The DCT algorithm produces one dc value for each block of the image being compressed. The dc value is a set of red, green, and blue values which are the mathematical average of the red, green and blue planes of pixels in the block. Alternatively, the mathematical average can be calculated outright over a block of pixels. This is done by actually summing all the red values and dividing by the number of pixels to create an average red value, and then repeating for the green and blue planes.

A simplified block diagram is shown in FIG. 3A of a still video player for reproducing a picture or for making a hard copy print from the digital image signals stored in compressed format in the memory card 24. With the card 24 inserted into a connector 100, the digital signals are accessed and processed in the decoder 102. The stored dc component of the transform (the "thumbnail" data) is directly applied to a selector 104 while the compressed image data is applied to an expander 106. An expansion algorithm, which is the conventional inverse of the compression algorithm of FIG. 1B, is shown in FIG. 3B and implemented by the expander 106 which includes a conventional sequence of minimum redundancy decoding (block 106a), denormalization (block 106b), serial-to-block conversion (block 106c), and inverse discrete cosine transformation (block 106d). The digital image data is expanded block-by-block and stored in an image buffer 108 as a decompressed image. A conventional thermal printer 110 is connected to the buffer 108 for making a hard copy thermal print from the decompressed image. The output of the image buffer 108 is also connected to the selector 104, which is under control of an operator-designated selection routine 112. When a "thumbnail" image is to be observed, the selector 104 routes the "thumbnail" data through a digital-to-analog (D/A) converter 114 to a conventional CRT monitor 116. Alternatively, the decompressed image signals are converted to analog form by the digital-to-analog (D/A) converter 114 and displayed on the conventional CRT monitor 116.

Figure 2B:
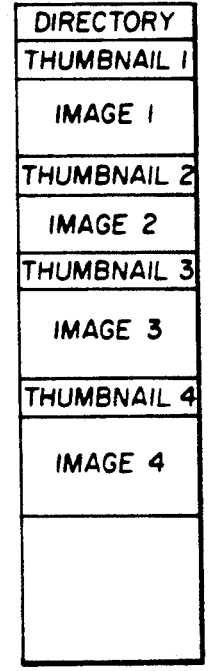
FIG. 2B is a diagram of a preferred file format for several full resolution images and their associated "thumbnail" images.

A principal advantage of the file format shown in FIGS. 2A and 2B is that an image, with its associated "thumbnail" representation, can be easily separated from the collection of images on the memory card 24 and transmitted to external devices for further processing. For instance, the image file can be sent to the printer 110 and the "thumbnail" image can be quickly examined on the monitor 116 before committing to a print. Likewise, an image file can be easily downloaded to a transceiving device (not shown) and the "thumbnail" image can be examined before deciding to transmit. If the entire image file is transmitted, the "thumbnail" image can be quickly recovered at the receiving end for a preview of the final image. Moreover, for a plural number of images, the corresponding "thumbnail" images can be quickly accessed and displayed either in a mosaic frame or in sequence in order to select the desired full resolution image for printing, displaying, transmitting, etc. Furthermore, the "thumbnail" images can be played back by a dedicated player such as illustrated in FIG. 3A or by a personal computer or like device that is programmed to accomplish the functions outlined in FIG. 3A. In the latter case, the personal computer forms the interface between the memory card 24 and a printer, a monitor, a transceiver, etc.

The invention has been described in detail with particular reference to a presently preferred embodiment, but it will be understood that variations and modifications can be effected within the spirit and scope of the invention.

What is claimed is:

1. Electronic still imaging apparatus employing digital processing of image signals corresponding to a still image and storage of the processed image signals in a digital memory, said imaging apparatus including an image sensor having an array of photosites corresponding to picture elements of the still image and means for exposing said sensor to image light so that analog image information is generated in respective photosites, said imaging apparatus comprising:

means for converting the analog image information into digital image signals corresponding to a predetermined picture resolution;

means for subsampling said digital image signals to generate reduced resolution image signals corresponding to a picture resolution lower than said predetermined resolution;

means for generating a multi-format image file representative of plural resolutions of the still image from the combination of said digital image signals and said reduced resolution image signals, said combination forming a singular file structure in which said reduced resolution image signals occupy a defined file area in relation to said digital image signals and are commonly accessible therewith for display and processing; and means for storing the image file in said digital memory.

2. The apparatus as claimed in claim 1 further including:

display means for generating a display image;

means for selecting an image file stored in said digital memory; and means for applying said reduced resolution image signals from said stored image file to said display means to generate a low resolution display of the still image.

3. The apparatus as claimed in claim 1 in which the sensor is sequentially exposed to a plurality of still images, said digital image signals and said reduced resolution image signals therefore corresponding to said plurality of images, said file generating means generating a separate multi-format image file for each still image from the digital image signals and the reduced resolution signals corresponding thereto, and said storing means storing each multi-format image file in said digital memory.

4. Electronic still imaging apparatus employing digital processing of image signals acquired from a plurality of still images and storage of the processed image signals in a removable digital memory, said imaging apparatus including an area image sensor having a two-dimensional array of photosites corresponding to picture elements of an image and means for exposing said sensor to image light so that analog image information is generated in respective photosites for each acquired image, said imaging apparatus comprising:

means for converting the analog image information into digital image signals corresponding to respective picture elements;

an image buffer for storing digital image signals corresponding to blocks of picture elements;

digital processing means for transforming blocks of stored digital image signals into corresponding sets of transform coefficient signals and for encoding the transform coefficient signals into a stream of compressed signals;

means responsive to said stored digital image signals for generating reduced resolution image signals corresponding to a reduced resolution version of each image;

means for forming a multi-format image file representative of plural versions of each acquired image, each image file including the reduced resolution image signals and the compressed signals for a particular still image; and means for downloading said image file for each acquired image to said removable digital memory.

5. The apparatus as claimed in claim 4 in which the reduced resolution image signals are generated from an average value of the digital image signals corresponding to each block of picture elements.

6. The apparatus as claimed in claim 5 in which the average values of the digital image signals are derived from the transform coefficient signals.

7. Electronic image processing apparatus employing digital processing of image signals corresponding to picture elements of a still image and storage of the processed image signals in a digital memory, said image processing apparatus comprising:

an image buffer for storing digital image signals corresponding to blocks of picture elements;

digital processing means for transforming blocks of stored digital image signals into corresponding sets of transform coefficient signals and for encoding the transform coefficient signals into a stream of compressed image signals, said digital processing means further generating reduced resolution image signals from said stored digital image signals;

means for generating a multi-format image file representative of plural resolutions of the still image, said image file including the reduced resolution image signals and the compressed image signals; and means responsive to said digital processing means for downloading the image file to said digital memory.

8. Apparatus as claimed in claim 7 in which said digital processing means generates an average signal for each block of stored digital image signals and said reduced resolution image signals are formed from said average signals.

9. An electronic image processing system employing digital processing of image signals corresponding to picture elements of a still image and storage of the processed image signals in a digital memory, said image processing system comprising:

an image buffer for storing digital image signals corresponding to blocks of picture elements;

digital processing means for transforming blocks of stored digital image signals into corresponding sets of transform coefficient signals and for encoding the transform coefficient signals into a stream of compressed image signals, said digital processing means further generating reduced resolution image signals from said stored digital image signals;

means for generating a multi-format image file representative of plural resolutions of the still image, said image file including the reduced resolution image signals and the compressed image signals;

means responsive to said digital processing means for downloading the image file to said digital memory;

means for selecting an image file stored in said digital memory; and playback means for operating on the selected image file and generating a reduced resolution image display from said reduced resolution image signals.

10. Electronic still imaging apparatus employing digital processing of image signals corresponding to a still image and storage of the processed image signals in a digital memory, said imaging apparatus including an image sensor having an array of photosites corresponding to picture elements of the still image and means for exposing said sensor to image light so that analog image information is generated in respective photosites, said imaging apparatus comprising:

means for converting the analog image information into digital image signals corresponding to a predetermined picture resolution;

means for averaging said digital image signals over local areas of the still image to generate reduced resolution image signals corresponding to a picture resolution lower than said predetermined resolution;

means for generating a multi-format image file representative of plural resolutions of the still image from the combination of said digital image signals and said reduced resolution image signals, said combination forming a singular file structure in which said reduced resolution image signals occupy a defined file area in relation to said digital image signals and are commonly accessible therewith for display and processing; and means for storing the image file in said digital memory.

11. The apparatus as claimed in claim 10 further including:

display means for generating a display image;

means for selecting an image file stored in said digital memory; and means for applying said reduced resolution image signals from said stored image file to said display means to generate a low resolution display of the still image.

12. Electronic still imaging apparatus employing digital processing of image signals corresponding to a still image and storage of the processed image signals in a digital memory, said imaging apparatus including an image sensor having an array of photosites corresponding to picture elements of the still image and means for exposing said sensor to image light so that analog image information is generated in respective photosites, said imaging apparatus comprising:

means for converting the analog image information into digital image signals corresponding to a predetermined picture resolution;

means operating on blocks of digital image signals for compressing said digital image signals and generating averages over said blocks;

means responsive to said averages produced by said compressing means for generating reduced resolution image signals corresponding to a picture resolution lower than said predetermined resolution;

means for generating a multi-format image file representative of plural resolutions of the still image from the combination of said compressed digital image signals and said reduced resolution image signals, said combination forming a singular file structure in which said reduced resolution image signals occupy a defined file area in relation to said compressed digital image signals and are commonly accessible therewith for display and processing; and means for storing the image file in said digital memory.

13. The apparatus as claimed in claim 12 in which said compressing means compresses the digital image signals in a plurality of stages, one stage including the performance of a discrete cosine transform on blocks of digital image signals and another stage including minimum redundancy encoding of the transformed image signals.

14. The apparatus as claimed in claim 13 wherein said discrete cosine transform produces a dc component and said reduced resolution image signals are generated from the dc component of the discrete cosine transform.

15. The apparatus as claimed in claim 12 further including:

display means for generating a display image;

means for selecting an image file stored in said digital memory; and means for applying said reduced resolution image signals from said stored image file to said display means to generate a low resolution display of the still image.

* * * * *